(12) United States Patent
Zhang et al.

(10) Patent No.: US 7,768,229 B2
(45) Date of Patent: Aug. 3, 2010

(54) ELECTRIC CAR CHARGING SYSTEMS

(75) Inventors: Jianhua Zhang, Shanghai (CN); Bin Guo, Shanghai (CN); Kaihua Niu, Shenzhen (CN)

(73) Assignee: BYD Company Limited, Shenzhen (CN)

( * ) Notice: Subject to any disclaimer, the term of this patent is extended or adjusted under 35 U.S.C. 154(b) by 270 days.

(21) Appl. No.: 11/857,429

(22) Filed: Sep. 18, 2007

(65) Prior Publication Data

US 2008/0067974 A1 Mar. 20, 2008

(30) Foreign Application Priority Data

Sep. 18, 2006 (CN) .................. 2006 1 0062677

(51) Int. Cl.
*H02J 7/14* (2006.01)
*H02J 9/00* (2006.01)
*B60L 1/00* (2006.01)

(52) U.S. Cl. .................... 320/104; 307/10.1; 307/66

(58) Field of Classification Search ................ 320/103, 320/104, 109, 111, 140, 141, 145; 307/9.1, 307/10.1, 66; 903/906, 907, 903
See application file for complete search history.

(56) References Cited

U.S. PATENT DOCUMENTS

| | | | | |
|---|---|---|---|---|
| 5,629,603 A * | 5/1997 | Kinoshita | .................. | 180/65.8 |
| 5,838,137 A * | 11/1998 | Kim | ............................ | 320/124 |
| 5,952,813 A * | 9/1999 | Ochiai | ........................ | 320/104 |
| 6,281,660 B1 * | 8/2001 | Abe | ............................. | 320/103 |
| 6,573,688 B2 * | 6/2003 | Nakanishi | ................... | 320/135 |
| 7,282,813 B2 * | 10/2007 | Unger et al. | ................. | 307/66 |
| 2003/0042866 A1 * | 3/2003 | Minamiura et al. | ......... | 320/104 |
| 2004/0169489 A1 * | 9/2004 | Hobbs | ........................ | 320/104 |
| 2004/0178766 A1 | 9/2004 | Bucur et al. | | |
| 2004/0251875 A1 * | 12/2004 | Kinoshita et al. | ........... | 320/136 |
| 2006/0152189 A1 * | 7/2006 | Ambrosio et al. | ........... | 320/104 |

FOREIGN PATENT DOCUMENTS

| | | | |
|---|---|---|---|
| CN | 2102577 U | 4/1992 |
| CN | 2347809 Y | 11/1999 |
| CN | 2615014 Y | 5/2004 |
| CN | 1885672 A | 12/2006 |
| CN | 200953476 Y | 9/2007 |
| JP | 2000224779 A | 8/2000 |
| JP | 2001078460 A | 3/2001 |
| JP | 2002199620 A | 7/2002 |

* cited by examiner

*Primary Examiner*—Edward Tso
*Assistant Examiner*—M'Baye Diao
(74) *Attorney, Agent, or Firm*—Venture Pacific Law, PC

(57) ABSTRACT

This invention discloses a type of charging system for electric cars which includes an AC electric grid power supply system and an electric car charging equipment. The AC electric grid power supply system couples energy outputs to the electric car charging equipment; its characteristics are: it also includes an battery power system and an electrical energy control module. The electrical energy input of the battery power system is controlled by and connected to the AC electric grid power supply system. The output is controlled by the electrical energy control module and coupled to the electric car charging equipment. With the addition of one or more battery packs to the battery charging system, instantaneous current increase can be provided through the use of the battery packs in order to alleviate the demand on the electric grid. The design capacity of the battery charging system is more ideal and it reduces the instantaneous capacity overload. Meanwhile when the external electric grid fails, it can rely on the battery packs to charge electric cars and thus resolving any urgent charging needs.

14 Claims, 9 Drawing Sheets

ELECTRIC CAR CHARGING SYSTEMS

CROSS REFERENCE

This application claims priority from a Chinese patent application entitled "Electric Car Charging Systems" filed on Sep. 18, 2006, having a Chinese Application No. 200610062677.3. This Chinese application is incorporated here by reference.

FIELD OF TECHNOLOGY

This invention relates to a type of electric car charging system, especially an electric car charging system that is suitable for use in a charging station.

BACKGROUND

A battery charging system is an essential, complementary electrical energy system to all types of electric cars. Being a necessary system for electric cars, its function is extremely huge.

Along with the development of electric cars, the electric car charging system will be deployed more as battery charging stations (like gas stations). The main function of a battery charging system is to charge the electric car. When a battery charging station supplies a quick charge to an electric car, the charge percentage at the moment can be one time to several dozens times. When several (at least more than one) electric cars simultaneously undergo a quick charge, the necessary current is extremely large which creates an enormous demand on the electric power grid. Therefore, it would be desirable to have battery charging systems that can utilize AC power grids and provide for high demand situations.

SUMMARY OF THE INVENTION

An object of the present invention is to provide battery charging systems that utilize AC power grids such as municipal power grids.

Another object of the present invention is to provide battery systems that can alleviate overloading conditions in battery charging systems such as battery charging stations.

Still another object of the present invention is to provide battery charging systems that utilize a combination of an AC power grid and battery packs to charge electric cars.

Yet still another object of the present invention is to provide battery charging systems that reduce instantaneous overloading.

Briefly, the present invention discloses a charging system, comprising: an AC electric grid power supply system; an electric car charging equipment; a battery power system; and an electrical energy control module; wherein the input to the battery power system is connected to the AC electric grid power supply system and the output is controlled by the electrical energy control module and coupled to the electric car charging equipment.

An advantage of the present invention is that it provides battery charging systems that utilize AC power grids such as municipal power grids.

Another advantage of the present invention is that it provides battery systems that can alleviate overloading conditions in battery charging systems such as battery charging stations.

Still another advantage of the present invention is that it provides battery charging systems that utilize a combination of an AC power grid and battery packs to charge electric cars.

Yet still another advantage of the present invention is that it provides battery charging systems that reduce instantaneous overloading.

DESCRIPTION OF DRAWING

The foregoing and other objects, aspects and advantages of the invention will be better understood from the following detailed description of the preferred embodiments of this invention when taken in conjunction with the accompanying drawings in which.

DETAILED DESCRIPTION OF THE PREFERRED EMBODIMENTS

Figure 1:
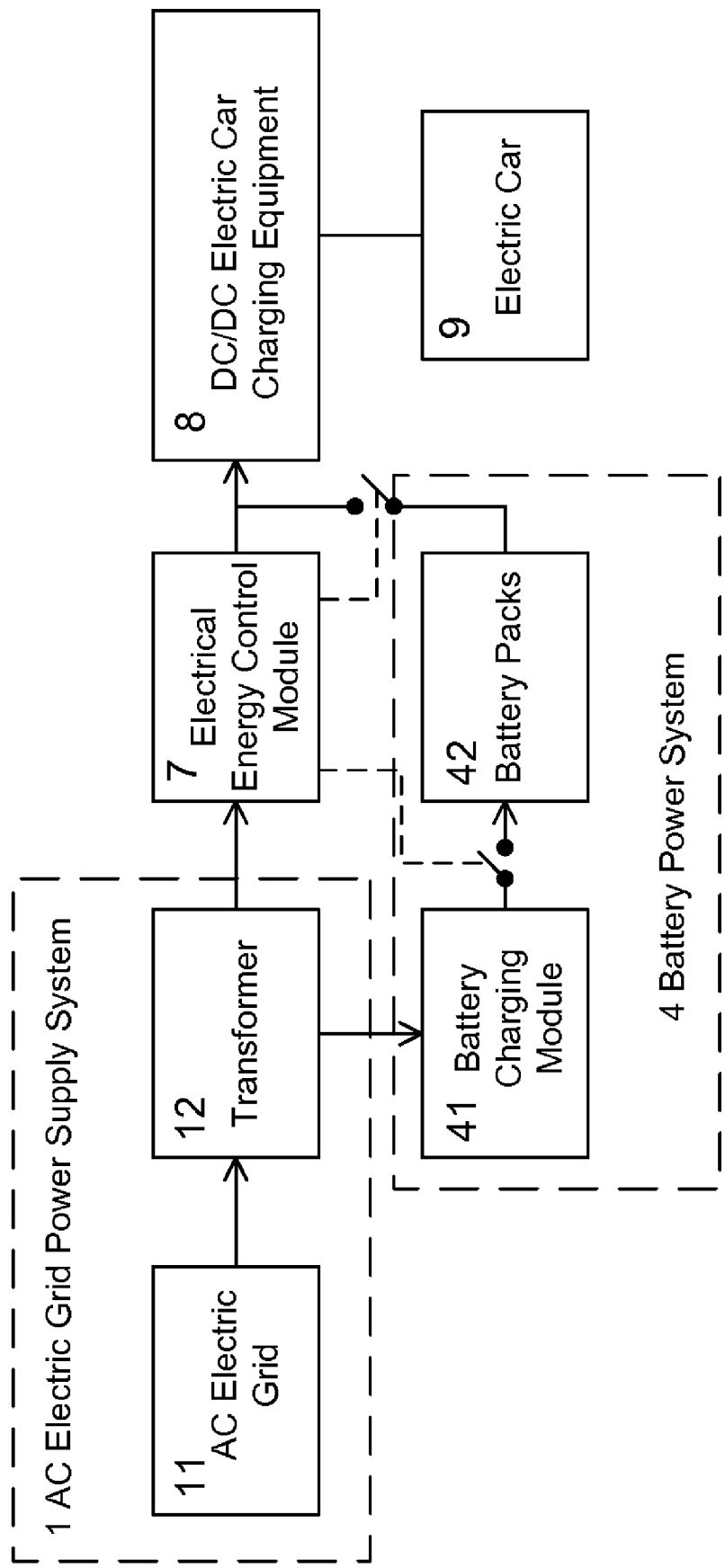
FIG. 1 is a principle block diagram of embodiment 1 of this invention.

To realize the above goals, the presently preferred embodiments of the invention provide a type of electric car charging system which includes an AC electric grid power supply system and electric car charging equipment. The AC electric grid power supply system outputs electrical energy and the output is coupled to the electric car charging equipment. Its characteristics are: it also includes a battery power system and an electrical energy control module. The electrical energy input to the battery power system is controlled by and connected to the AC electric grid power supply system. The output is coupled to the electric car charging equipment and is controlled by the electrical energy control module.

In addition, this invention describes many battery power systems and correspondingly many electrical energy control modules and several electric car charging equipments. Each battery power system is controlled through its corresponding electrical energy control module and then it is coupled to the corresponding electric car charging equipment.

Alternatively, there can be many of the electrical energy control modules and the electric car charging equipment and they correspond to each other one-to-one.

The AC electric grid power supply system includes an AC electric grid that provides AC electrical energy as input and an isolating transformer that converts the electrical energy input from the AC electric grid into DC and coupling the output to the electric car charging equipment.

The battery power system includes battery packs and battery charging modules. The battery charging module can receive the electrical energy from the AC electric grid power supply system to charge the battery packs.

The electrical energy control module includes a switch component, a voltage sampling circuit, a current sampling circuit, and a comparing circuit. The voltage sampling circuit uses different sampling voltages to sample the voltage and the current sampling circuit samples the current. In the comparing circuit, the said sampling voltages and sampling current are compared with a reference voltage and a reference current set by the reference voltage and current setting circuit respectively. When the sampled voltage is lower than the reference voltage or the sampled current is higher than the reference current, the switch component is switched on causing the battery power system to connect to the electric car charging equipment.

The electrical energy control module includes a switch component, a voltage sampling circuit, a current sampling circuit, a comparing circuit, and a step-up circuit. The voltage sampling circuit uses different sampling voltages to sample voltages and the current sampling circuit samples the current. In the comparing circuit, the sampling voltage and sampling current are compared with the reference voltage and the reference current set by the reference voltage and current setting circuit respectively. When the sampled voltage value is lower than the reference voltage or the sampled current value is higher than the reference current, the switch component is switched on causing the battery power system to connect to the electric car charging equipment through the step-up circuit.

The step-up circuit includes a PWM control IC, a rectifier diode, an output capacitor, and an energy storing inductor. The PWM control IC control end is connected to the output of the comparing circuit. The PWM control IC pulse width signal output is connected to the control end of the switch component. The connection relationships among the switch component, the rectifier diode, the output capacitor, and the storage inductor satisfy the following requirement: that the battery power system voltage undergoes the step-up process before connecting to the electric car charging equipment.

Based on the above proposal, by adding battery packs to the charging system, it can fully utilize the characteristic of the battery packs where its ability to instantaneously release large current can alleviate the demand placed on the electric grid of the battery charging station. Thus it allows the design capacity of the battery charging station to be more reasonable and it reduces the instantaneous capacity overloading. Also, when the exterior electric power grid is cut off, it can rely on the battery packs to charge the electric car and resolve urgent charging demands.

Embodiments

The following is a detail description of this invention using the battery charging station as an example.

Embodiment 1

As shown in FIG. 1, the battery charging station of this invention is a type of battery charging station that is equipped with battery packs. It includes an AC electric grid power system 1, a battery power system 4, an electrical energy control module 7, and a DC/DC electric car charging equipment 8.

The AC electric grid power system 1 includes: an AC electric grid 11 that supplies AC electrical energy as input and an isolating transformer 12 that converts the electrical energy from the AC electric grid into DC output and provide it to the electrical energy control module 7 (it is eventually coupled to and output to the electric car charging equipment 8). The battery power system 4 includes: battery packs 42, a battery pack charging module 41, where the battery packs having many segments and there may be more than one batteries connected in series or connected in parallel on such basis. The voltage is similar to the output voltage from the transformer. The battery charging module 41 can use the energy from the AC electric grid power supply system 1 to charge the battery packs 42.

The AC electric grid power supply system 1 and the battery power system 4 output electrical energy to the electrical energy control module 7 and allow it to control and output electrical energy to the DC/DC electric car charging system 8 to charge the electric car 9.

This proposal is different from the conventional battery charging station in that it has an additional battery power system. That system has two functions: one is when the battery charging station load is high, the battery power system is combined with the battery charging system to supplement the system; two is when the electric grid fails and that electric power supply is cut off, the battery power system can charge the electric cars. In order to provide this control function, it requires the electrical energy control module 7. To determine whether the electric grid load is overloaded, it is done mainly through examining the output current and output voltage of the isolating transformer. When the output current exceeds a preset value or when the isolating transformer output voltage drops below a preset value, it is determined that the electric grid is overloaded. On the other hand, the electrical energy control module 7 can examine the voltage of the battery packs. If the voltage is low and that the battery charging system load is not too large, it can start the battery charging module to charge the battery packs.

Figure 6:
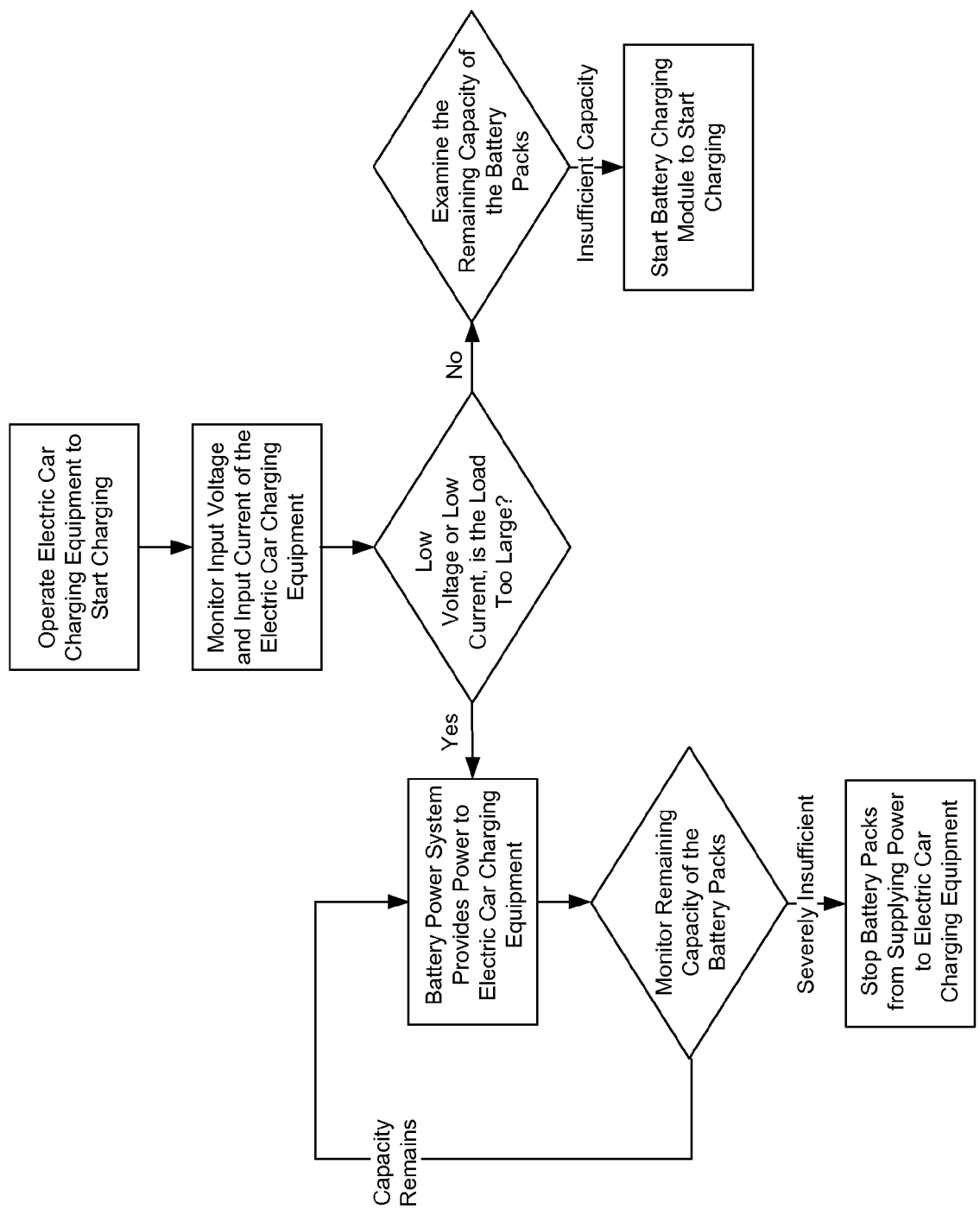
FIG. 6 is a flow chart of one or more embodiments of this invention.

Its operating principle is: as shown in FIG. 6, when the load on the electric power grid is large (the control module 7, through examining the output current and the isolating transformer output voltage, can determine the load when the output current exceeds a preset value or when the output voltage drops below a preset value.) If the number of electric cars waiting to be charged is high or they need to have a quick battery charge, the electrical energy control module 7 joins the battery power system 4 with the AC electric grid power supply system 1 to simultaneously charge the electric cars 9. Meanwhile, the isolating transformer does not charge the battery packs (see below for description in controlling the charging of the battery packs 42). When the electric grid load is light, such as when the number of electric cars waiting to be charged is low or when there is no need for a quick battery charge, then the electrical energy control module 7 supplies the electrical energy from the AC electric grid power supply system 1 to charge the electric cars 9, and at the same time it also supplies energy to charge the battery packs 42 (see below for description in controlling the charging of battery packs 42) so that it can be readied for use when the next electric grid overload occurs. When there is an AC electric grid power supply system 1 failure from an accident, the electrical energy control module 7 can utilize the battery power system 4 to charge the electric cars 9, preventing interruption in the battery charging service due to a power failure.

The methods for the control module 7 to determine whether there is an overload is performed through examining the output current and the isolating transformer output voltage and are explained as follows: if the lower limit of the stable operating value of the output DC voltage from the AC electric grid power system is U1, then the lower limit of the stable operating value of the input voltage of the DC/DC electric car charging equipment is U1 (currently the battery charging voltage is 200V). If the upper limit of the stable operating value of the output current of the AC electric grid power system is A1, then the upper limit of the stable operating value of the input current to the electric car charging equipment is A1. The electrical energy control module conducts real time examination of these voltage values and current values. When the voltage drops below U1 or when the current exceeds A1, then the load is determined to be overloaded. The control switch component Q1 turn on the battery power system. If the battery voltage is slightly higher than U1 (e.g. 220V), it can guarantee to increase, within a certain time frame (quick charging one electric car requires approximately 10 minutes), the ability of the charging system to supply power.

There are several methods to control the charging of the battery packs 42, for example: 1. by the battery charging control module, its advantages include the ability to control whether to charge or not to charge and the amount of current to charge; 2. this module can be controlled manually to charge or not to charge; 3. it can also be controlled by the control module 7 to determine if the battery packs need to be charged. FIG. 1 shows the third method. Regardless of which method, the need to charge the battery can be determined by the output voltage at the time.

Embodiment 2

Figure 2:
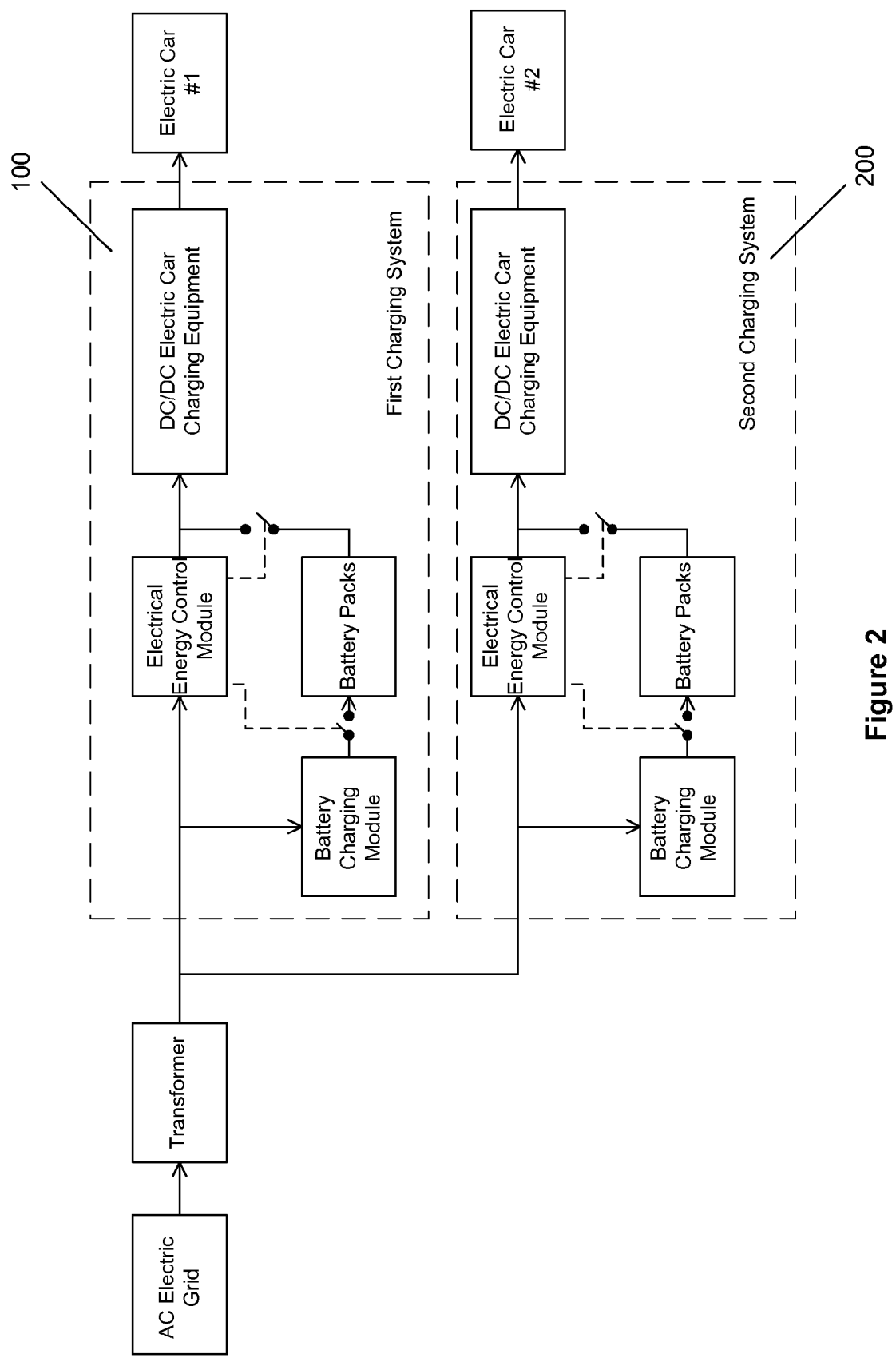
FIG. 2 is a principle block diagram of embodiment 2 of this invention.

As shown in FIG. 2, the difference from example 1 is that the back of the AC electric grid power system can connect with several groups of electric car charging systems: the first charging system is 100, the second charging system is 200 . . . , each group of the charging system comprises of an independent battery power system and each battery pack only supplies to its charging system, thus its capacity is moderate.

Embodiment 3

Figure 3:
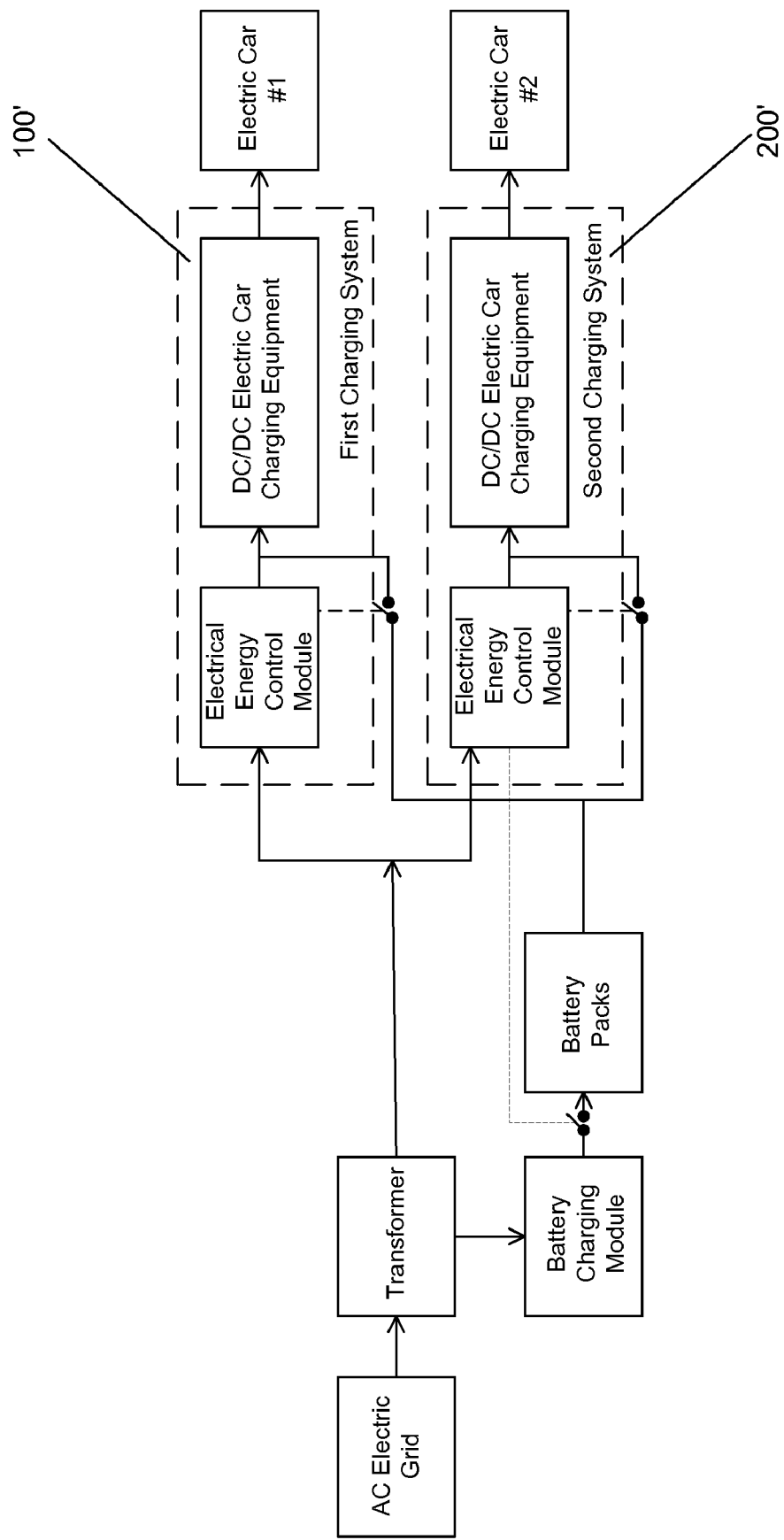
FIG. 3 is a principle block diagram of embodiment 3 of this invention.

As shown in FIG. 3, the difference from example 2 is: the back of the AC electric power grid supplied power system can connect with several groups of electric car charging systems (the first charging system is 100' the second charging system is 200' . . . ) and they all share a battery power system. This battery power system can supply one or more groups in the charging system, thus its capacity is larger.

Embodiment 4

Figure 4:
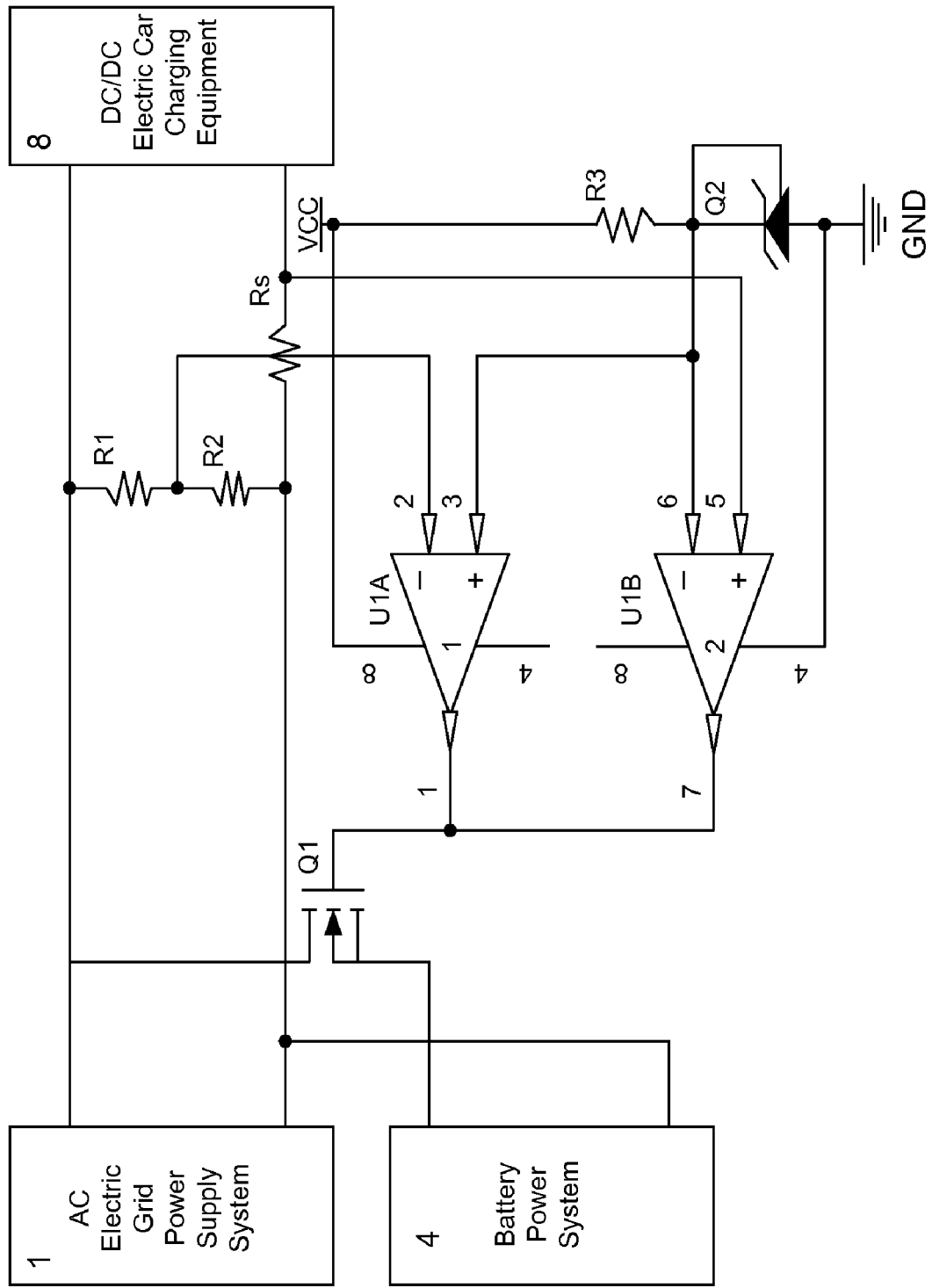
FIG. 4 is a principle block diagram of embodiment 4 of this invention.

As shown in FIG. 4, this example is equivalent to showing an embodiment of the electrical energy control module 7 described in embodiment 1 (this Figure omits the connection between the AC electric grid power supply system 1 and the battery power system 4). The switch component Q1 can be a MOS, IGBT, or silicon controlled switch type switch components that can control electricity. It can also use a relay, a hybrid set, high voltage isolating switch, a load switch, etc. as high voltage switch components. R1 and R2 provide different voltages to sample voltages thereby forming the voltage sampling circuit. Rs samples current to form the current sampling circuit. In the comparing circuit, these values are compared with the reference voltage and the reference current that are preset by the reference voltage and current setting circuit Q2. When the sampled voltage value is lower than the reference voltage or the sampled current value is higher than the reference current, then Q is switched on causing the battery power system (4) to combine with the electric car charging equipment to increase the power supplying capability.

This method has certain requirements with respect to the voltage level from the battery power system. That is if voltage has not reached U1 when the battery power system needs to connect with the power supply grid, then it will not function as expected. Therefore, it must be when the load is not high, then promptly turn on the battery charging module to charge the battery packs so that it can ensure the voltage reaches above U1.

Embodiment 5

Figure 5:
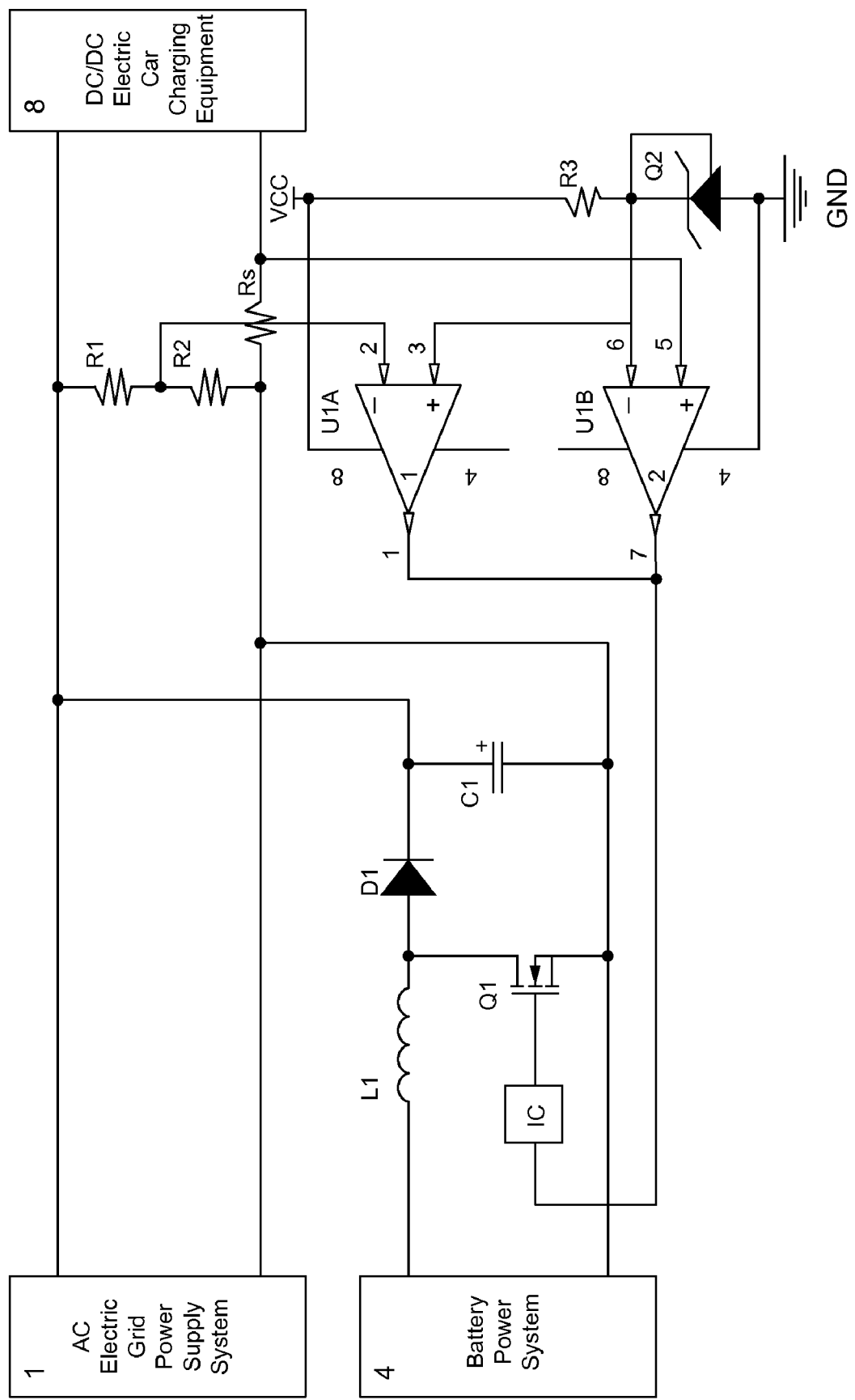
FIG. 5 is a principle block diagram of embodiment 5 of this invention.

As shown in FIG. 5, this example is also showing an embodiment of the electrical energy control module 7 described in embodiment 1 (this Figure omits the connection between the AC electric grid power system 1 and the battery power system 4). Similar to embodiment 4, it also merges the battery packs with the AC electric grid power system. The difference is that embodiment 4 directly merges the battery packs and it does not alter the electrical energy (voltage step-up or step-down etc.); whereas in embodiment 5, the electrical energy is changed before being merged (the example shows a step-up, which is the diagram shown in FIG. 5).

Its operating principle is: R1 and R2 provide different sampling voltages to sample voltages, and Rs samples the current, and these values are compared with the Q2 reference voltage. When the sampling voltage value is lower or the sampling current value is higher than the reference voltage, the IC is switched on (PWM control IC, which is the pulse width modulation IC) causing the battery power system to turn on the electric car charging equipment through the step-up circuit, resulting in an increase in the capability in supplying power. There are many PWM control IC products in the market and a common one is UC3842. This IC is used to control Q1 conduction and FIG. 5 simplifies the IC feedback input. It can be understood that the comparing circuit on the right side outputs an enabling signal to the IC, and then the step-up circuit begins work by increasing the voltage to the voltage level required by the electric car charging equipment. In this manner, it sends the electrical energy from the battery power system to the electric car charging equipment.

The step-up circuit includes a PWM control IC, a rectifier diode D1, an output capacitor C1 and a storing inductor L1. The PWM control IC control end is connected to the output of the comparing circuit U1A and U1B. The PWM control IC pulse width signal output is connected to the control end of the switch component Q1. The connection relationships among the switch component Q1, rectifier diode D1, output capacitance C1, and pulse width signal L1 are as shown in FIG. 5; but it is not limited to the method shown in FIG. 5 because the step-up circuit has several forms; it is suitable as long as the circuit satisfies the following requirement: that the battery power system 4 voltage undergoes the step-up process before turning on the electric car charging equipment (8).

This method is advantageous over embodiment 4 in that the requirement for the voltage of the battery packs is low. Since the electrical energy control module comprises of a step-up circuit; even if the voltage of the battery power system does not reached U1 or even lower, it can still supply power through the step-up circuit. It also outputs a more stable voltage to the electric car charging equipment.

Figure 7:
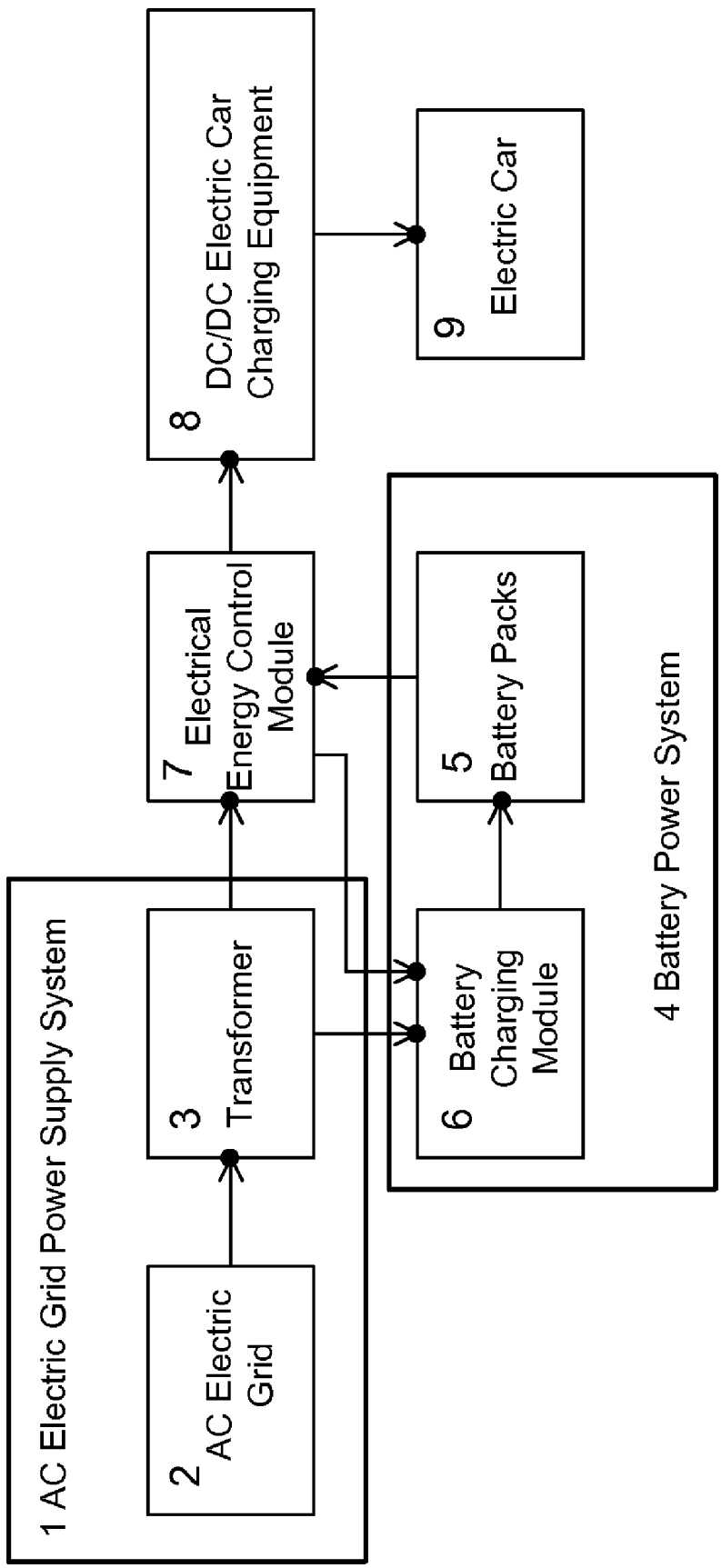
FIG. 7 is a principle block diagram of another embodiment of this invention.

FIG. 7 illustrates yet another block diagram of an embodiment of the present invention.

The electrical energy control module can be further implemented with many different methods including the follow two methods.

In the first method, the electrical energy control module includes a switch component, a voltage sampling circuit, a current sampling circuit, and a comparing circuit. The voltage sampling circuit uses different voltages to sample the voltage and the current sampling circuit samples the current. In the comparing circuit, the sampling voltage and the sampling current are compared with a reference voltage and a reference current set by the reference voltage and current setting circuit respectively. When the sampling voltage value is lower than the reference voltage or the sampling current value is higher than the reference current, the switch component is switched on causing the battery power system to turn on and connected to the electric car charging equipment. This proposal offers a simple electrical energy control module; but it has specific requirement with respect to the voltage level of the battery packs. If the output voltage of the isolating transformer is V0 at idle and the output voltage is V1 at full load, since the transformer has a copper-loss characteristic where V0 is greater than V1, therefore, when the charging output increases, the output voltage of the isolating transformer decreases. The electrical energy control module in this proposal only controls whether the battery pack turns on the electric car charging equipment but it does not perform any changes to the voltage level. Thus, only when the battery voltage is between V1 and V0, its energy can be sent to the electric car charging equipment. In comparison, when the battery pack voltage level is close to V0 and after the battery pack engages the charging equipment, the current supplied to the charging equipment is greater. Conversely, when the battery pack voltage is close to V1, the current supplied to the charging equipment is smaller. Moreover, as the energy level of the battery pack is consumed, the voltage will drop. As a result, the output current of the battery pack will also drop.

In the second method, the electrical energy control module includes a switch component, a voltage sampling circuit, a current sampling circuit, a comparing circuit, and a DC/DC circuit. The voltage sampling circuit uses different voltage levels to sample voltage and the current sampling circuit samples the current. In the comparing circuit, the sampling voltage and sampling current are compared with a reference voltage and a reference current set by the reference voltage and current setting circuit respectively. When the sampling voltage value is lower than the reference voltage or when the sampling current value is higher than the reference current, the switch component is switched on causing the battery power system to turn on and connect to the electric car charging equipment through the DC/DC circuit. The electrical energy control module of this method, due to the addition of the DC/DC circuit, the requirement on the battery voltage state is not as strict. Similarly, if the output voltage of the isolating transformer is V0 at idle, and the output voltage is V1 at full load, since the transformer has a copper-loss characteristic where V0 is greater than V1, when the charging output power increases, the output voltage of the isolating transformer decreases. When the battery pack needs to be connected to the charging equipment, the battery voltage can be converted to be between V1 and V0 through this electrical energy control module. When the converted voltage is closer to V0 and after the battery pack engages the charging equipment, the current supplied to the charging equipment is also greater. Conversely, when the converted voltage is closer to V1, the current supplied to the charging equipment is also smaller. Moreover, because this electrical energy control module is also equipped with a DC/DC circuit function, a constant voltage output can be obtained. Thus, even when the battery voltage has a drop due to the electrical energy consumption, it will not affect the current level supplied to the charging equipment.

The DC/DC circuit mentioned in the above method can select different circuit topology according to the battery voltage of the battery packs, such as a step-up, step-down, or a step-up/step-down circuit. Since the voltage drops when the battery discharges, the step-up circuit is chosen. Moreover, choosing the step-up circuit allows the use of fewer batteries connected in series.

The step-up circuit includes a PWM control IC, a rectifier diode, an output capacitor, and a storage inductor. The PWM control IC control end is connected to the output of the comparing circuit. The PWM control IC pulse signal output is connected to the switch component control end. The connection relationships among the switch component, the rectifier diode, the output capacitor, and storage inductor satisfy the following requirement: that the battery power system voltage undergoes the step-up process before turning on and connecting the electric car charging equipment.

Based on the above method, by adding battery packs to the charging system, it can fully utilize the characteristic of the battery packs where its ability to instantaneously release large current can alleviate the demand placed on the power grid of the battery charging station. Thus the capacity of the battery charging station can be more reasonable and reduces the instantaneous capacity overload. Meanwhile, when the electric grid is cut off, it can rely on the battery packs to charge the electric cars and resolve urgent charging needs.

On the other hand, it can also add a DC/AC converter that can modulate the electrical energy of the battery packs to 220V AC power. When the battery charging station power system is interrupted, it can modulate the electrical energy of the battery packs to supply AC power to electrical equipment requiring AC power so that the battery charging station can continue to operate normally (DC/AC converter technology is also a matured technology. It is widely used in UPS power source).

Figure 8:
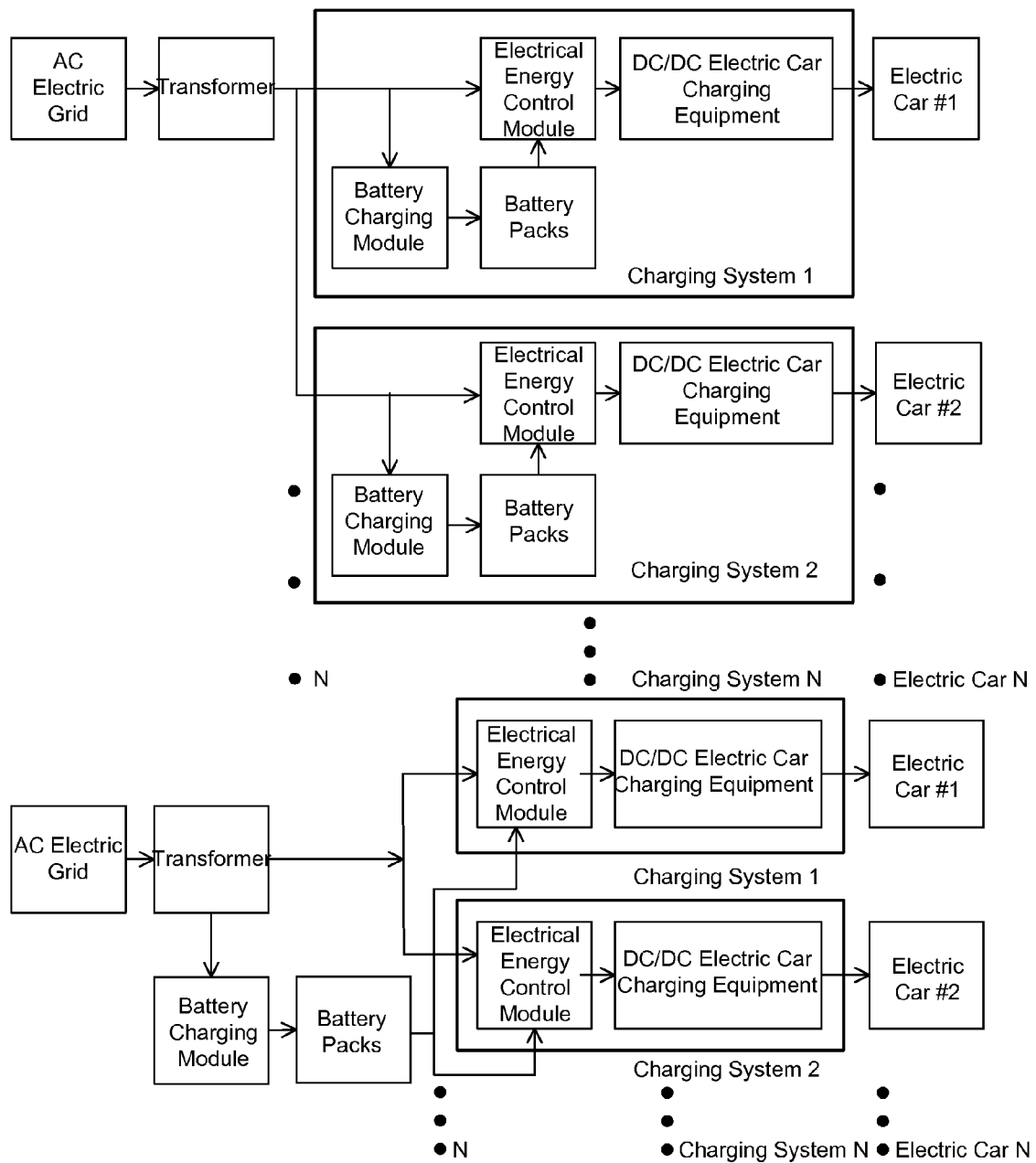
FIG. 8 is a principle block diagram of another embodiment of this invention.
Figure 9:
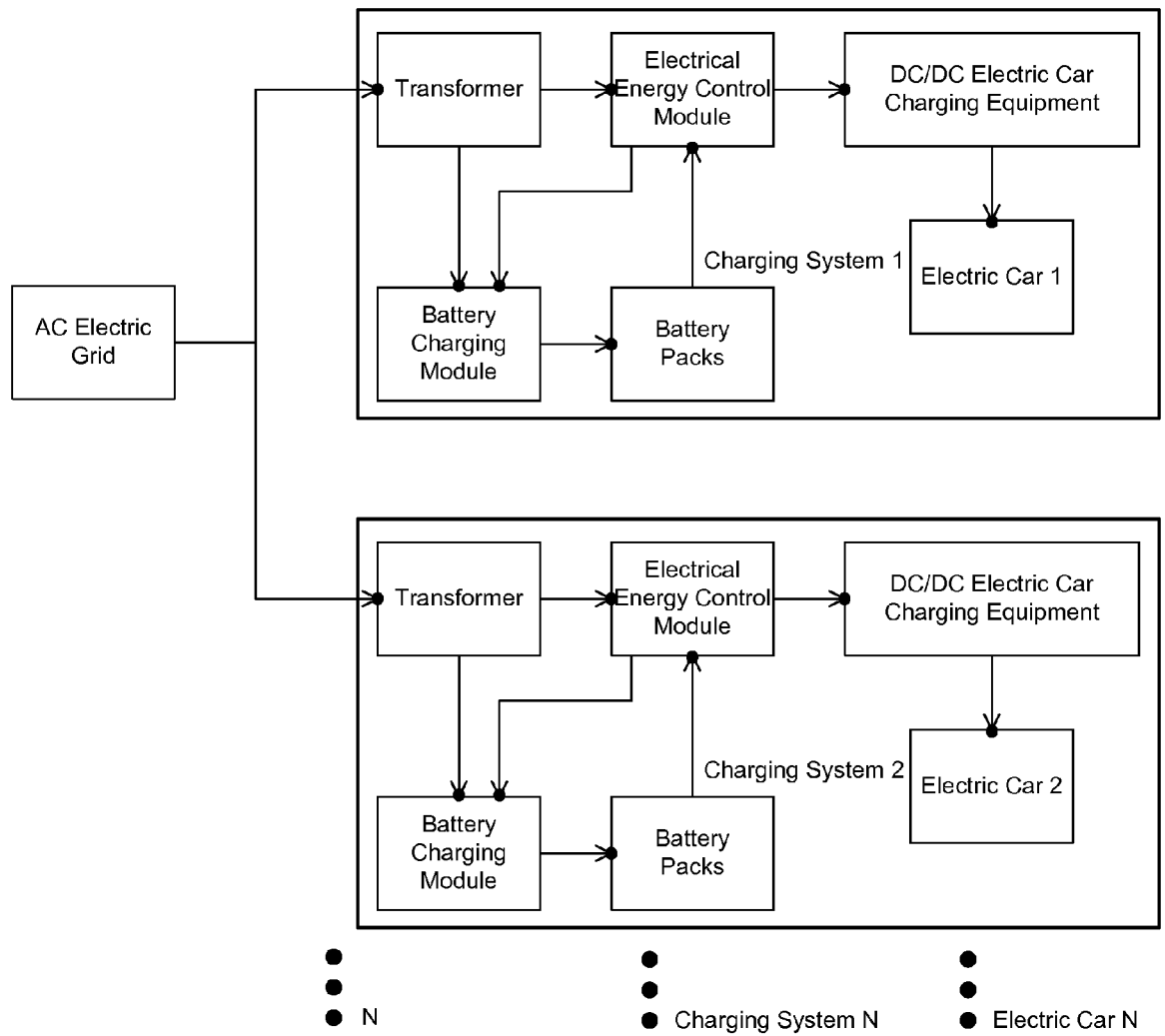
FIG. 9 is a principle block diagram of another embodiment of this invention.

Lastly, based on the above one-to-one power supply methods, there can be a number of electrical energy control modules and electric car charging equipment, where they can correspond to each other one-to-one. With the AC electric grid power supply system, there are many connection methods for the battery power system as illustrated by the FIGS. 8 and 9.

The examples are only used to explain this invention and it is not meant to limit the claim protection of this invention. The domain technical personnel under the enlightenment of this invention may make certain adjustments of the implementation samples; but all of which are still within the claim protection of this invention. For instance: the voltage current sampling methods can be of many types; it can sample differentially or use Hall sensor sampling; the battery power system uses a step-up method preferentially because its circuit has a rectifier diode D1 which itself can conduct. (When the step-up circuit is not turned on, the accumulator battery voltage is lower than the AC electric power grid voltage and thus it does not merge.) Obviously, it can base on the concrete parameters (relates to the amount of the battery voltage and the AC electric grid power system output voltage) to choose the different types of topology structures. Under the condition that the battery capacity is adequate, the battery packs can be replaced by a single battery. As the electric car receives AC charging, DC/DC electric car charging equipment 8 can also use DC/AC electric car charging equipment. The electrical energy control module main control body can also be an ECU or DSP type IC and it can be used for examination and control etc.

While the present invention has been described with reference to certain preferred embodiments, it is to be understood that the present invention is not limited to such specific embodiments. Rather, it is the inventor's contention that the invention be understood and construed in its broadest meaning as reflected by the following claims. Thus, these claims are to be understood as incorporating not only the preferred embodiments described herein but also all those other and further alterations and modifications as would be apparent to those of ordinarily skilled in the art.

We claim:

1. A charging system, comprising:
   an AC electric grid power supply system;
   an electric car charging equipment;
   a battery power system; and
   an electrical energy control module; wherein the input to the battery power system is connected to the AC electric grid power supply system and the output is controlled by the electrical energy control module and coupled to the electric car charging equipment; and
   wherein when the AC electric grid power supply system is not supplying power, the electrical energy control module is configured to connect the battery power system electrically to the electric car charging equipment such that the battery power system provides power to the electric car charging equipment to charge an electric car.

2. The charging system of claim 1 wherein when a load on the charging system is high, the electrical energy control module is configured to connect the battery power system electrically to the electric car charging equipment such that the battery power system provides power to the electric car charging equipment to charge an electric car.

3. The charging system of claim 2 wherein when the AC electric grid power supply system is not supplying power, the electrical energy control module is configured to connect the battery power system electrically to the electric car charging equipment such that the battery power system provides power to the electric car charging equipment to charge an electric car.

4. The charging system of claim 1 wherein the battery power system has a battery charging module and one or more battery packs, and when the remaining capacity of the battery packs is low, the battery packs stop supplying power to the electric car charging equipment.

5. The charging system of claim 4 wherein the battery power system has a battery charging module and one or more battery packs, and when the remaining capacity of the battery packs is low, the battery packs are charged.

6. The charging system of claim 1 wherein the electrical energy control module includes a switch component (Q1), a voltage sampling circuit (R1, R2), a current sampling circuit (Rs), and a comparing circuit (U1A, U1B), wherein the voltage sampling circuit (R1, R2) samples voltages and the current sampling circuit (Rs) samples current; wherein in the comparing circuit (U1A, U1B), the sampling voltage and sampling current are compared with a reference voltage and reference current set by the reference voltage and current setting circuit (Q2) respectively; wherein when the sampling voltage value is lower than the reference voltage or the sampling current value is higher than the reference current, the switch component (Q1) is switched on to cause the battery power system (4) to connect to the electric car charging equipment.

7. The charging system of claim 6 wherein the electrical energy control module further includes a step-up circuit; wherein when the sampling voltage value is lower than the reference voltage or the sampling current value is higher than the reference current, the switch component is switched on causing the battery power system (4) to connect to the electric car charging equipment through the step-up circuit.

8. The charging system of claim 7 wherein the step-up circuit includes a PWM control IC, a rectifier diode (D1), an output capacitor (C1), and a storage inductor (L1); wherein the PWM control IC control ends are connected to the outputs of the comparing circuit (U1A, U1B); the pulse signal output of the PWM control IC is connected to the control end of the switch component (Q1); wherein the connection relationships among the switch component (Q1), the rectifier diode (D1), the output capacitor (C1), and the inductor (L1) satisfy the following requirement: that the voltage of the battery packs of the battery power system undergoes the step-up process before connecting to the electric car charging equipment.

9. The charging system of claim 1, wherein the AC electric grid power supply system comprises:
   an electric grid providing AC electrical energy; and
   a transformer converting the electrical energy from the AC electric grid into DC and is connected to the electric car charging equipment.

10. The charging system of claim 1, wherein the charging system is provided with a plurality of the battery power systems and the electrical energy control modules, and each of the battery power system is connected to one of a plurality of the electric car charging equipment via the corresponding electrical energy control modules.

11. The charging system of claim 1, wherein the charging system is provided with the battery power system and a plurality of electrical energy control modules, and each of the electric energy control module is connected to one of a plurality of the electric car charging equipment and the battery power system.

12. An electric car charging system, comprising:
   an AC electric grid power supply system;
   an electric car charging equipment;
   a battery power system having a battery charging module and one or more battery packs, wherein the battery power system selectively charges an electric car; and
   an electrical energy control module;
   wherein the input to the battery power system is connected to the AC electric grid power supply system and the output is controlled by the electrical energy control module and coupled to the electric car charging equipment; and
   wherein when a load on the charging system is high, the electrical energy control module is configured to connect the battery power system electrically to the electric car charging equipment such that the battery power system provides power to the electric car charging equipment to charge an electric car.

13. The charging system of claim 12 wherein when the AC electric grid power supply system is not supplying power, the electrical energy control module is configured to connect the battery power system electrically to the electric car charging equipment such that the battery power system provides power to the electric car charging equipment to charge an electric car.

14. An electric car charging system, comprising:
   an AC electric grid power supply system;
   an electric car charging equipment;
   a battery power system having a battery charging module and one or more battery packs; and
   an electrical energy control module;
   wherein the input to the battery power system is connected to the AC electric grid power supply system and the output is controlled by the electrical energy control module and coupled to the electric car charging equipment;

wherein there is one or more electric car charging stations each for charging an electric car, each station comprising an electric car charging equipment and an electrical energy control module;

wherein there is a battery charging system in each of the one or more electric car charging stations;

wherein the electrical energy control module of each of the one or more electric car charging stations controls the battery charging system;

wherein when the load on the one or more electric car charging stations is high, the battery charging system provides power to the electric car charging equipment;

wherein when the remaining capacity of the battery packs is low, the battery packs stop supplying power to the electric car charging equipment; and wherein when the remaining capacity of the battery packs is low, the battery packs are charged.

* * * * *